(12) United States Patent
Gunari et al.

(10) Patent No.: US 9,221,994 B2
(45) Date of Patent: Dec. 29, 2015

(54) AQUEOUS BASED PROCESS TO FABRICATE NANOSTRUCTURED BLOCK COPOLYMER FILMS

(75) Inventors: Nikhil A. Gunari, Etobicoke (CA); Gilbert C. Walker, Mississauga (CA)

(73) Assignee: SYLLETA INC., Toronto, ON (CA)

( * ) Notice: Subject to any disclaimer, the term of this patent is extended or adjusted under 35 U.S.C. 154(b) by 2 days.

(21) Appl. No.: 13/642,620

(22) PCT Filed: Apr. 20, 2011

(86) PCT No.: PCT/CA2011/050212
§ 371 (c)(1),
(2), (4) Date: Dec. 26, 2012

(87) PCT Pub. No.: WO2011/130857
PCT Pub. Date: Oct. 27, 2011

(65) Prior Publication Data
US 2013/0096006 A1    Apr. 18, 2013

Related U.S. Application Data (60) Provisional application No. 61/326,938, filed on Apr. 22, 2010.

(51) Int. Cl.
| | | |
|---|---|---|
| C09D 153/00 | (2006.01) | |
| C08J 3/07 | (2006.01) | |
| C08J 3/09 | (2006.01) | |
| C08J 3/24 | (2006.01) | |
| C09D 5/16 | (2006.01) | |

(52) U.S. Cl.
CPC ............... C09D 153/00 (2013.01); C08J 3/07 (2013.01); C08J 3/09 (2013.01); C08J 3/24 (2013.01); C09D 5/1668 (2013.01); C08J 2353/00 (2013.01)

(58) Field of Classification Search
CPC ............................ C08J 2353/00; C08J 3/07
USPC ........... 424/400; 504/360; 524/612; 204/554; 426/640; 427/256, 510, 240
See application file for complete search history.

(56) References Cited

U.S. PATENT DOCUMENTS

| | | | |
|---|---|---|---|
| 2008/0195192 A1* | 8/2008 | Parsonage | .................... 623/1.16 |
| 2008/0274454 A1* | 11/2008 | Mirkin et al. | ..................... 435/6 |
| 2009/0308842 A1* | 12/2009 | Mela et al. | ....................... 216/48 |
| 2011/0091925 A1 | 4/2011 | Ryan et al. | |

OTHER PUBLICATIONS

Lin et al. (Biomaterials 30 (2009) 108-117.*
Lei et al. (Polymer 47 (2006) 2723-2727).*
Sanyal et al (J. Mater. Chem,. 2009,. 2009, 19, 8974-8981).*
Patent Cooperation Treaty. International Search Report. PCT/CA2011/050212. Completed Aug. 3, 2011. Mailed Sep. 1, 2011.
Patent Cooperation Treaty. Written Opinion of the International Searching Authority. PCT/CA2011/050212. Completed Aug. 25, 2011.
Sanyal et al. Water dispersible semiconductor nanorod assemblies via a facile phase transfer and their application as fluorescent biomarkers. Journal of Materials Chemistry. 19(47) pp. 8974-8981. 2009.
Wang et al. Synthesis of amphiphilic triblock copolymers as multidentate ligands for biocompatible coating of quantum dots. Colloids and Surfaces. A. Physicochemical and Engineering Aspects. 375(1-3) pp. 147-155. Feb. 5, 2011.

* cited by examiner

*Primary Examiner* — Anna Falkowitz
(74) *Attorney, Agent, or Firm* — Lynn C. Schumacher; Stephen W. Leonard; Hill & Schumacher (57) ABSTRACT

The present invention provides a method to transfer block copolymers from water immiscible organic phase to aqueous phase using a phase transfer agent. At higher concentrations, micellar networks of the block copolymers were obtained in the aqueous solution that can be coated onto a variety of substrates. Block copolymer films showed very good antifouling properties. The phase transferred block copolymers can be used to synthesize encapsulated nanoparticle aggregates for biodiagnostic imaging applications. The phase transferred block copolymer micelles can be used to encapsulate active compounds. The invention has applications in drug delivery, crop protection, and medical device coating.

20 Claims, 11 Drawing Sheets

AQUEOUS BASED PROCESS TO FABRICATE NANOSTRUCTURED BLOCK COPOLYMER FILMS

RELATED PATENT APPLICATIONS

This patent application is a National Phase application claiming the benefit of PCT/CA2011/050212 filed on Apr. 20, 2011, in English, which further claims priority of the U.S. provisional patent application No. 61/326,938 filed on Apr. 22, 2010, the whole content being incorporated herein by explicit reference for all intents and purposes.

GOVERNMENT SUPPORT

The subject matter of this application has been supported in part by U.S. Government Support under the Office of Naval Research RIS Fund No. 458844. Accordingly, the U.S. Government has certain rights in this invention.

FIELD OF THE INVENTION

The invention relates to a method to transfer block copolymers from water immiscible organic solvents to an aqueous phase. The aim of the invention is to assist large-scale transfer of block copolymers from organic to aqueous phase.

BACKGROUND OF THE INVENTION

The significance of block copolymers is evident in light of the wide array of properties they possess. These properties are due to the arrangement of different polymers in alternating sequence. Block copolymers are exceptionally interesting because they can "microphase separate" to form periodic nanostructures. Block copolymers can also self-assemble, similar to small surfactant molecules, to form micelles. Due to these inherent properties, block copolymers can be used in a wide range of applications.

Self assembly of amphiphilic block copolymers in aqueous solution has received attention in the past few decades due to their potential applications in nanotechnology and nanobiotechnology (Allen et. al. [1999] Colloids and Surfaces B. 16:3-27, Kraemer et. al. [2002] Angew. Chem. Int. Ed. 22: 41). Most developments of aqueous-based formulations have focused on drug delivery systems.

There are two principal ways for preparing amphiphilic block copolymer micelles in aqueous solution: the direct dissolution method and the indirect method (Allen et. al. [1999] Colloids and Surfaces B. 16:3-27). Polymers that are poorly soluble in water require the indirect method i.e. dialysis or solvent evaporation. Dialysis is a slow process and is limited to low volumes. Solvent evaporation creates low-volatile organic compound (VOC) problems and may require expensive recovery processes. Also, the above mentioned indirect method involves transferring amphiphilic block copolymers from water miscible solvents such as dimethylformamide, tetrahydrofuran or dimethylacetamide to aqueous solution.

Related work on phase transfer process was employed for transferring inorganic nanoparticles from organic phase to aqueous phase using a small molecule 4-dimethylaminopyridine (DMAP) as the phase transfer agent (Caruso et. al. [2006] US Patent Publication No. 2006/0084705 A1). Their process is limited to the organic phase having lower density than the aqueous phase and also requires high concentrations of the phase transfer agent. However, until this invention, the phase transfer process using a phase transfer agent to transfer amphiphilic block copolymer from organic to aqueous phase to obtain micelles and micellar aggregates has not been developed.

SUMMARY OF THE INVENTION

The present invention is a method of indirect dissolution of amphiphilic block copolymers which involves a phase transfer process in the presence of a phase transfer agent to assist transfer of the block copolymer from a water immiscible organic phase to aqueous phase for low-VOC coatings.

The present invention provides a method of transferring block copolymers from organic phase to aqueous phase targeted to VOC coatings, controlled nanoparticle synthesis in aqueous environment and active compound encapsulation. The method can also be used for transferring nanoparticles into aqueous solution and to direct the assembly of arrays of nanoparticles.

In one embodiment of the present invention, there is provided a method to fabricate a low-VOC coating for application to surfaces for, in particular, preventing biofouling. In particular, the invention relates to a phase transfer process wherein an amphiphilic block copolymer is transferred from water immiscible organic solvent to an aqueous solution. The main aspect disclosed in the present invention is the use of a phase transfer agent dissolved in the aqueous solution to assist and accelerate the phase transfer of the amphiphilic block copolymer from organic to aqueous phase to obtain a micellar solution.

Thus, an embodiment of the present invention provides a method of transferring a block copolymer from an organic phase to an aqueous phase comprising:

a) dissolving an amphiphilic block copolymer in an organic solvent or a mixture thereof; and b) transferring the amphiphilic block copolymer to an aqueous solution in the presence of a phase transfer agent to obtain a micellar solution.

The amphiphilic block copolymer may be a diblock, a triblock, or a multiblock copolymer. The multiblock copolymer may include tetrablock copolymers to heptablock copolymers. The block copolymer may be selected from the group comprising polystyrene-block-poly(2-vinyl pyridine)-block-poly(ethylene oxide), polystyrene-block-poly(4-vinyl pyridine)-block-poly(ethylene oxide), polystyrene-block-poly(2-vinyl pyridine)-block-poly(N-isopropyl acrylamide), polystyrene-block-poly(2-vinyl pyridine)-block-poly(ethylene oxide), and poly(t-butyl styrene-b-hydrogenated isoprene-b-sulfonated styrene-b-hydrogenated isoprene-b-t-butyl styrene).

The molecular weight of the block copolymer may be from about 1,000 g/mol to about 1,000,000 g/mol. The amphiphilic block copolymer may be one of neutral or charged. The phase transfer agent may be a diblock copolymer having the formula A'B'. A' and B' may have significantly different hydrophobicity from each other. The molecular weight of A' and B' may be in a range from about 1,000 g/mol to about 1,000,000 g/mol.

The organic solvent may be a water-immiscible organic solvent. The organic solvent may be any one of chloroform, toluene, pentane, hexane, heptane, decane and cyclohexane, and benzene.

The micellar solution may be applied to a surface of a substrate to produce nanosized patterns on the surface and cross-linking the block copolymer nanosized pattern to form a coating. The block copolymer nanosized pattern may be cross-linked using an initiator agent. The initiator agent may be any one or combination of radical initiators, cationic initiators, anionic initiator, heat and ultraviolet light. The initiator agent may be a photo-initiator selected from the group consisting of benzophenone, benzoin ethyl ether, and [1,12-dodecanediylbis(oxy-4,1-phenylene)][bis[phenylmethanone]. The micellar solution is applied to the surface by spin-coating, solvent-casting, brushing, immersing, spraying or pouring the solution over the surface. The solution may be applied to the surface in sufficient quantity to give a coating thickness in a range from about 20 nm to about 300 nm. The coating may be illuminated with ultraviolet light in order to improve stability and mechanical properties of the coating.

A further understanding of the functional and advantageous aspects of the invention can be realized by reference to the following detailed description and drawings.

BRIEF DESCRIPTION OF THE DRAWINGS

Preferred embodiments of the invention will now be described, by way of example only, with reference to the drawings, in which:

FIGS. 9A, B show conventional transmission electron microscopy images of encapsulated gold nanoparticles synthesized using aqueous triblock copolymer micelles;

DETAILED DESCRIPTION OF INVENTION

Generally speaking, the embodiments described herein are directed to a method of transferring block copolymers from organic phase to aqueous phase targeted to low-volatile organic compound (VOC) coatings, controlled nanoparticle synthesis in aqueous environment and active compound encapsulation. In particular coatings to prevent biofouling and/or to affect (enhance or inhibit) the settlement and growth of other organisms or cells, synthesis of encapsulated nanoparticle aggregates for biodiagnostic imaging, active compound encapsulation for controlled release and drug encapsulated medical device coatings. As required, embodiments of the present invention are disclosed herein. However, the disclosed embodiments are merely exemplary, and it should be understood that the invention may be embodied in many various and alternative forms.

The figures are not to scale and some features may be exaggerated or minimized to show details of particular elements while related elements may have been eliminated to prevent obscuring novel aspects. Therefore, specific method, structural and functional details disclosed herein are not to be interpreted as limiting but merely as a basis for the claims and as a representative basis for teaching one skilled in the art to variously employ the present invention. For purposes of teaching and not limitation, an aqueous process to fabricate nanostructured block copolymer films for applications to low-VOC antifouling coatings and/or to affect (enhance or inhibit) the settlement and growth of other organisms or cells are disclosed herein.

As used herein, the terms "about", and "approximately" when used in conjunction with ranges of concentrations, temperatures or other physical or chemical properties or characteristics is meant to cover slight variations that may exist in the upper and lower limits of the ranges of properties/characteristics.

As used herein, "phase transfer process" refers to the method of transporting, transferring or allowing to pass molecules, in particular polymers, from organic phase to aqueous phase.

As used herein, "phase transfer agent" refers to a compound assisting in transporting, transferring or allowing to pass molecules, in particular polymers, from organic phase to aqueous phase.

As used herein, "organic phase" refers to a water immiscible solvent.

As used herein, "contacting" refers to the act of touching, making contact, or of bringing within immediate proximity.

As used herein, "coating" refers to a manufacturing process or preparation for applying an adherent layer to a surface.

A coating can also be a layer of material that at least partially covers an underlying surface, such as an aquaculture cage, fishing nets, a boat hull or any other surface that requires an antifouling coating or control (enhancement or inhibition) of the settlement and growth of organisms and/or cells As used herein, "volatile organic compound (VOC)" refers to organic compounds with significant vapour pressures that can affect the quality of the environment.

As used herein, "low-VOC" refers to volatile organic compounds in the range of about 10 g/L or less.

As used herein, "composition" refers to block copolymer solution and or mixed photo-initiators.

Figure 1:
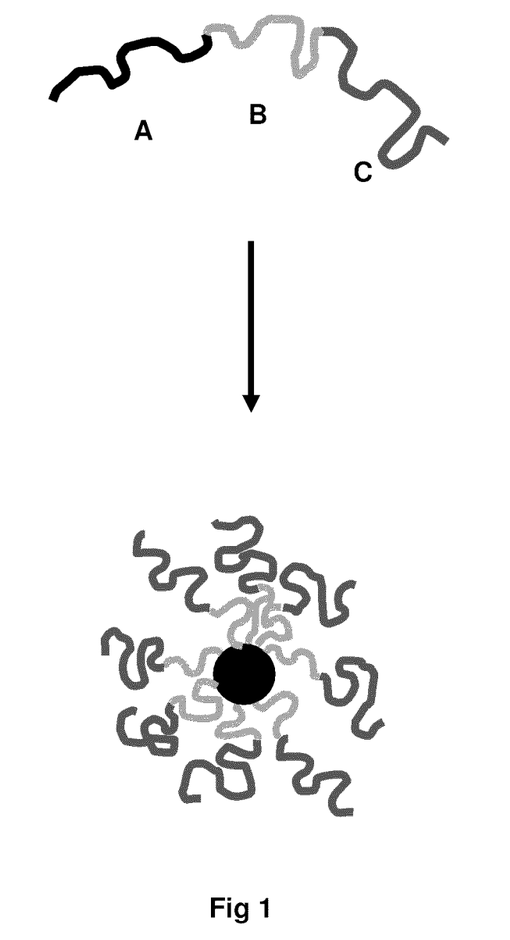
FIG. 1 illustrates a schematic of an ABC type diblock copolymer in which the A part of the copolymer chain can have the same or different molecular weight than the B and C part of the copolymer chain. The figure also shows the schematics of ABC block polymers self-assembling into micelles in selective solvents for one block.

As used herein, "triblock copolymer" refers to a polymer that has three blocks of different polymerized monomers linked by covalent bonds that can self-assemble to form micelles as shown in FIG. 1.

As used herein, "triblock copolymer" refers to a polymer that has three blocks of either two or three different polymerized monomers linked by covalent bonds that can undergo phase separation. If the copolymer has two different monomers they are ABA or BAB type, however for simplicity they are only called ABA type, while if they have three different monomers, they are called ABC type.

As used herein, "multiblock copolymer" refers to a polymer that has four or more blocks of at least three different polymerized monomers linked by covalent bonds that can undergo phase separation.

As used herein, A'B' diblock copolymer refers to a phase transfer agent where at least one block is hydrophilic.

As used herein, "film" refers to a thin material layer ranging from a few nanometers to several hundred nanometers.

As used herein, "biofouling" refers to the accumulation of living organisms such as diatoms, bacteria, algae, tubeworms or barnacles on surfaces immersed in seawater.

As used herein, "antifouling" refers to the prevention of marine organisms to settle on surfaces.

As used herein, "nanoparticle" refers to a particle having one or more dimensions of the order of 100 nm or less.

As used herein, "active compound" refers to a molecule that is biologically active and includes insecticides, herbicides, pharmaceuticals and flavouring materials.

As used herein, "encapsulation" refers to the enclosure of an active compound within a relatively stable shell for controlled release.

Specific values and types of compounds such as solvents, photo-initiators, phase transfer agents or copolymers as well as specific embodiments of the invention described herein are for illustration only. They do not exclude other values and types as would be recognized by one skilled in the art.

An embodiment of the present invention provides a method of transferring a block copolymer from an organic phase to an aqueous phase which includes dissolving an amphiphilic block copolymer in an organic solvent or a mixture thereof; and transferring the amphiphilic block copolymer to an aqueous solution in the presence of a phase transfer agent to obtain a micellar solution.

The amphiphilic block copolymer may be either one of a diblock, a triblock, or a multiblock copolymer. The multiblock copolymer may include tetrablock copolymers to heptablock copolymers.

The present invention giving a method of fabricating amphiphilic block (i.e. diblock, triblock or multiblock which includes tetrablock to heptablock) copolymer. The micellar solutions may be used to produce thin film coatings to reduce biofouling of surfaces immersed in a marine environment and/or to affect the settlement and growth of organisms and/or cells. In addition, the method may be used to give controlled aggregation of metal nanoparticles within individual block copolymer micelles. The method of encapsulating nanoparticles may be used in applications in biodiagnostic imaging. The aqueous micellar solutions as described above can be used for encapsulation of a number of different active agents including insecticides, herbicides, pharmaceuticals and flavouring materials. The solutions provide encapsulated active compounds that can be used in controlled/slow release of active molecules in crop protection, drug delivery and flavouring compounds in the food and beverage industry.

Phase transferred biodegradable and biocompatible block copolymer micellar solutions may be used for the fabrication of films deposited onto metals including stainless steel using the dip-coating method in addition to other known methods. This may be used in drug-encapsulated medical device coatings such as stents and the like.

In one embodiment, the present invention provides compositions for marine paints and surface treatments that inhibit settlement of marine organisms.

Figure 2A:
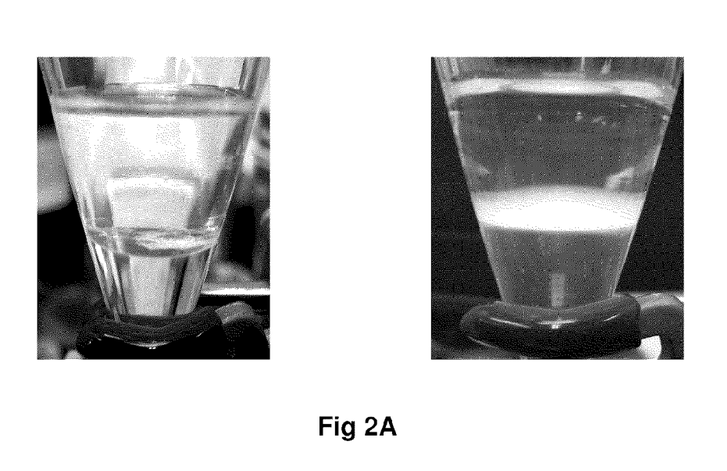
FIG. 2A shows a photograph of polystyrene-block-poly(2-vinyl pyridine)-block-poly(ethylene oxide) in a two phase system before (left) and after (right) phase transfer. The upper phase is aqueous and the lower one is chloroform.

In a preferred embodiment of the present invention, A'B' diblock copolymer is used as a phase transfer agent to transfer ABC triblock copolymers, mixed or not mixed with photo-initiator, from a water immiscible organic phase to aqueous phase. Depending on the application, the triblock copolymer, its molecular weight and its concentration may be selected. The phase transfer process of the triblock copolymers is initiated immediately when the two immiscible phases are in contact with the aqueous phase containing the phase transfer agent and if the concentration of micelles is high a turbid solution is obtained after time "t" as shown in FIG. 2A.

The useful triblock copolymers according to the present invention include the ones in which the A and C blocks of the copolymer have different hydrophobicities and B is pH responsive block. The hydrophobicity of the two blocks and responsive nature of one block can be tailored to target either a specific organisms or a group of them. For example, algae avoid settling on hydrophilic surfaces and thus, for a coating, blocks will be chosen that have a different hydrophobicity and are hydrophilic such as polymers based on ethylene oxide. On the other hand, if the organism targeted avoids hydrophobic surfaces, then blocks that are hydrophobic may be chosen such as fluorinated polymers.

In a preferred embodiment of the present invention, the solution forms a micellar assembly to exhibit a closely packed nanostructured pattern on a substrate that can be UV cross-linked. The coatings are cross-linked to improve stability under water and mechanical properties.

It will be appreciated that the photo-initiators may be any one or combination of radical initiator, cationic initiator or anionic initiator.

Figure 2B:
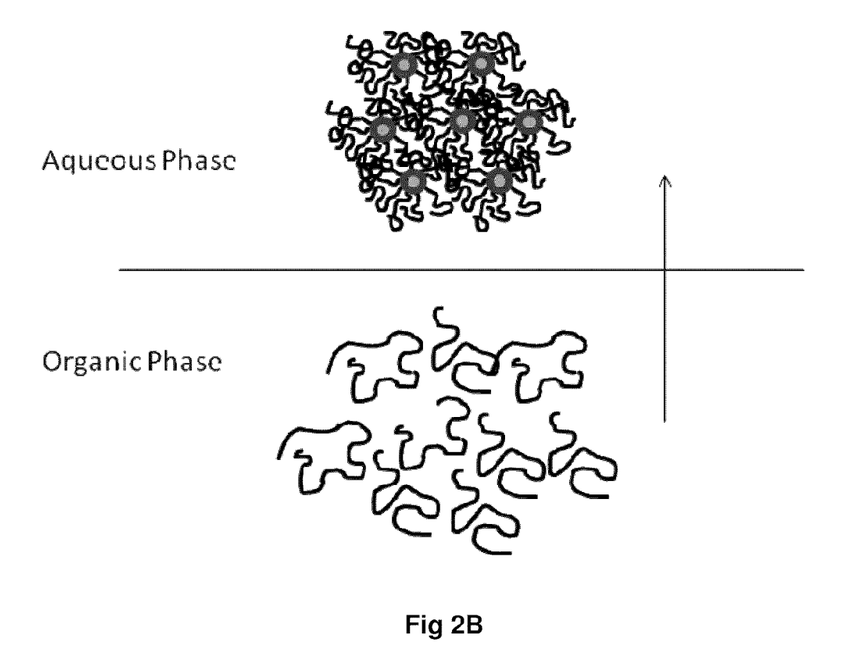
FIG. 2B shows a schematic of the phase transfer of the linear triblock block copolymer from organic phase to the aqueous phase to form a micellar network.

In a preferred embodiment of the present invention, the ABC triblock copolymer forms a micellar network in the aqueous solution when the concentration of the triblock copolymer micelles high as shown in FIG. 2B.

In a preferred embodiment of the invention the triblock copolymer can have a molecular weight from about 1,000 g/mol to about 1,000,000 g/mol. In a specific embodiment, the triblock copolymer molecular weight can be from 10,000 g/mol to 40,000 g/mol. Since length of each of the A, B and C blocks is proportional to the molecular weight of each of the A, B and C blocks, the overall size of the resulting pattern is proportional to the molecular weights of each of the A, B and C blocks. Thus a copolymer with a small molecular weight will produce a smaller pattern than a copolymer with a larger molecular weight. Molecular weights and stimulus responsive blocks can be used to target a specific organisms or a group of them and or cells.

Another method to vary the pattern size is to have a responsive block that responds to either pH or temperature. The swelling or shrinking of the block can be used to tune the size of the features on the surface. A poly(2-vinyl pyridine) block can be used as a pH responsive block. Below pH 5 the block swells and above pH 5 the block shrinks so depending on the molecular weight the length of the block and hence the size of the features on the surface can be tuned.

Similar to ABC triblock copolymers the ABA type can be used to obtain nanosized patterns on surfaces, where A may be hydrophobic and B may be hydrophilic or vice-versa. In the case where A is hydrophobic then the ratio of the average number molecular weight of A:B:A should be at least 1:3:1 and in the case where A is hydrophilic the average number molecular weight of B should not exceed the combined average number molecular weight of the A blocks The pattern is also influenced by the same factors as diblock copolymers. Thus, they can be used as an alternative material to fabricate this antifouling coating and/or coatings to affect (enhance or inhibit) organism or cell settlement and growth.

The ABA triblock copolymer may have a molecular weight in a range from about 1,000 g/mol to about 1,000,000 g/mol.

As non-limiting examples, the coating may be made from a ABA triblock copolymer is selected from the group consisting of polylactide-block-poly (ethylene oxide-block-polylactide, poly(caprolactone)-block-poly(ethylene oxide)-block-poly(caprolactone), polystyrene-block-poly (acrylic acid)-block-polystyrene, polystyrene-block-poly(4-vinyl pyridine)-block-polystyrene, polystyrene-block-poly(ethylene oxide)-block-polystyrene, and poly(ethylene oxide)-block-poly(dimethylsiloxane)-block-poly(ethylene oxide).

In a specific embodiment of the present invention, the diblock copolymer polystyrene-block-poly(ethylene oxide) dissolved in aqueous solution was used as a phase transfer agent to facilitate and improve the transfer of polystyrene-block-poly(2-vinyl pyridine)-block-poly(ethylene oxide) from chloroform to aqueous solution. When the concentration of micelles formed in the aqueous solution is high a micellar network is obtained. The two solutions are separated with a high concentration of micelles in the aqueous solution.

A complete transfer of the triblock copolymer is not observed which is evident by running the phase transfer process again with the separated chloroform solution and fresh aqueous solution comprising the phase transfer agent. The second extraction also leads to a micellar solution.

Triblock copolymer films produced in accordance with the present invention undergo minimal surface reconstruction in a polar environment such as seawater. These films can be used as antifouling coatings as a substitute for metal biocides paints in the surface protection of structures such as aquaculture cages, ship hulls and so on.

The films of the present invention can be used as a coating and protecting layer for surfaces that require antifouling properties. The coatings can form either single layer coatings or multi-layer coatings.

The coating fabricated from the diblock copolymer can be used independently as an antifouling coating or in conjunction with a base layer of another polymer. This other polymer can be a random copolymer made of the same monomers as the diblock copolymer used in the coating.

The process can be used to transfer block copolymers and nanoparticles embedded in the block copolymers.

A further embodiment of the present invention is directed towards a method of coating a surface that requires an antifouling coating and/or cell settlement inhibition/enhancing coatings with the present composition. A surface can be coated by contacting this surface with the composition by dip-coating, spray-coating, brushing, solvent-casting, or pouring. The resulting layer will provide a nano-patterned surface which can provide a protective coating to inhibit biofouling and/or enhance desired cell growth.

The surfaces that can be coated include, but are not limited to, surfaces made of nylon, polyester, polyethylene, steel, silicon or glass.

The amount of material used and the method of coating will result in coatings with various thicknesses. The coating can result in a top layer of 20 nm to 300 nm in thickness.

EXAMPLES

The following are examples that illustrate a method for the preparation of compositions of the present invention to fabricate films on substrates and to encapsulate metal nanoparticles and active compounds for different applications. These examples are intended to illustrate the nature of such preparations are not intended to be limiting in the scope of applicable methods.

Example 1

Fabrication of a Coating Based on Polystyrene-Block-Poly(2-Vinyl Pyridine)-Block-Poly(Ethylene Oxide)

Materials and Methods

Polystyrene-block-poly(2-vinyl pyridine)-block-poly(ethylene oxide) triblock copolymer (Polymer Source) was used without further purification. Polystyrene-block-poly(2-vinyl pyridine)-block-poly(ethylene oxide) (polydispersity index 1.09, number average molecular weight for polystyrene 13,000 g/mol, for poly(2-vinyl pyridine) 13,000 g/mol, and for poly(ethylene oxide) 36,000 g/mol) was dissolved in chloroform to give a 5 wt %. Polystyrene-block-poly(ethylene oxide) (polydispersity index 1.05, number average molecular weight for polystyrene 3,600 g/mol and for poly(ethylene oxide) 67,000 g/mol) was dissolved in pH 1 aqueous solution. Polystyrene-block-poly(ethylene oxide) was used as a phase transfer agent. The triblock copolymer solution was introduced into a separatory funnel and the aqueous solution containing the phase transfer agent is added to the funnel. The two solutions were separated after two hours. The aqueous solution was turbid. The triblock copolymer extracted aqueous solution was dip-coated onto a piranha cleaned silicon substrate. The resulting films were UV irradiated using a Mercury Arc Lamp (Pen-Ray, 90-0012-01) with an intensity of 15 mW/cm$^2$ for 5 minutes in air.

Surface Characterization

The surface topography was investigated using Atomic Force Microscopy (AFM). Measurements in air were performed with the AFM (Digital Instruments, Dimension 5000) operated in Tapping Mode and rectangular shaped silicon probes (NanoWorld, NCH) with resonance frequencies in the range 280-320 kHz and a spring constant of 40 N/m. All measurements in solution were obtained using the Molecular Force Probe AFM (Asylum Research, MFP-3D) operated in the iDrive mode and V-shaped, silicon nitride cantilevers (Asylum Research, AR-iDrive) with a spring constant of 100 pN/nm.

Results and Discussion

Figure 3A:
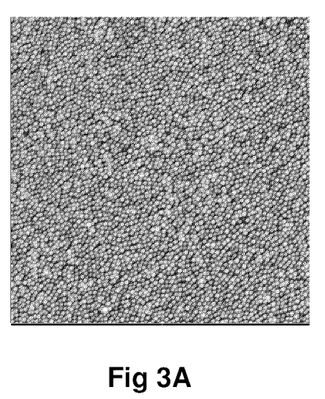
FIG. 3A illustrates a representative AFM height-image of a triblock copolymer film dip-coated onto piranha-cleaned silicon substrates, the image size is 5 µm×5 µm and the Z range is 150 nm.

Films made from polystyrene-block-poly(2-vinyl pyridine)-block-poly(ethylene oxide) by dip-coating onto silicon displayed a nanostructured brush-like topography as shown in FIG. 3A.

Figure 3B:
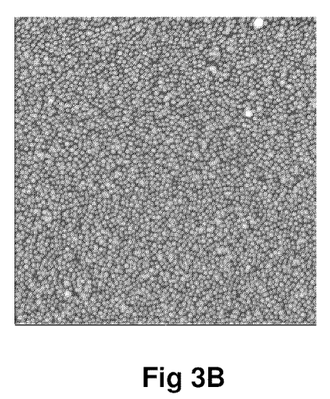
FIG. 3B illustrates a representative AFM height-image of a UV cross-linked triblock copolymer film, the image size is 5 µm×5 µm, and the Z range is 150 nm.

The films after photo cross-linking are shown in FIG. 3B. The films are observed to be intact after UV irradiation.

Figure 3C:
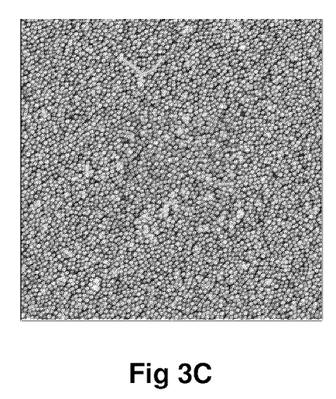
FIG. 3C illustrates a representative AFM height-image of a cross-linked triblock copolymer film imaged in air after immersion in water for 72 hours, the image size is 5 µm×5 µm, and the Z range is 150 nm.

Pattern retention was investigated by immersing these films in water. The brush-like structure remains unchanged when placed in water for 72 hours as can be seen in FIG. 3C. Thus, the UV cross-linking stabilizes the surface groups.

Conclusion

The fabrication of films using a triblock copolymer by dip-coating was successful. The results show that the nanoscale pattern of these films is preserved in water. Thus, this method can be used for a low-volatile organic compound (VOC) coating processes.

It will be understood that solvent-casting, brushing, immersing or pouring the composition over the desired surface are viable methods. This example is for illustration purposes only.

Example 2

An Aqueous Based Process to Fabricate Thin Film Coatings of Polystyrene-Block-Poly(2-Vinyl Pyridine)-Block-Poly(Ethylene Oxide) on Nylon Ropes Materials and Methods Polystyrene-block-poly(2-vinyl pyridine)-block-poly(ethylene oxide) triblock copolymer (Polymer Source) was used without further purification. Polystyrene-block-poly(2-vinyl pyridine)-block-poly(ethylene oxide) (polydispersity index 1.09, number average molecular weight for polystyrene 13,000 g/mol, for poly(2-vinyl pyridine) 13,000 g/mol and for poly(ethylene oxide) 36,000 g/mol) was dissolved in chloroform to give a 5 wt %. Polystyrene-block-poly(ethylene oxide) (polydispersity index 1.05, number average molecular weight for polystyrene 3,600 g/mol and for poly(ethylene oxide) 67,000 g/mol) was dissolved in pH 1 aqueous solution. Polystyrene-block-poly(ethylene oxide) was used as a phase transfer agent. The triblock copolymer solution was introduced into a separatory funnel and the aqueous solution containing the phase transfer agent is added to the funnel. The two solutions were separated after two hours. The aqueous solution was turbid. Nylon ropes were coated with the triblock copolymer by dip-coating. The films were UV irradiated using a Mercury Arc Lamp (Pen-Ray, 90-0012-01) with an intensity of 15 mW/cm² for 5 minutes in air.

Surface Characterization

The surface topography of polymer coated nylon ropes was investigated using a scanning electron microscope (SEM) (S-5200, Hitachi, Japan)

Results and Discussion

Figure 4:
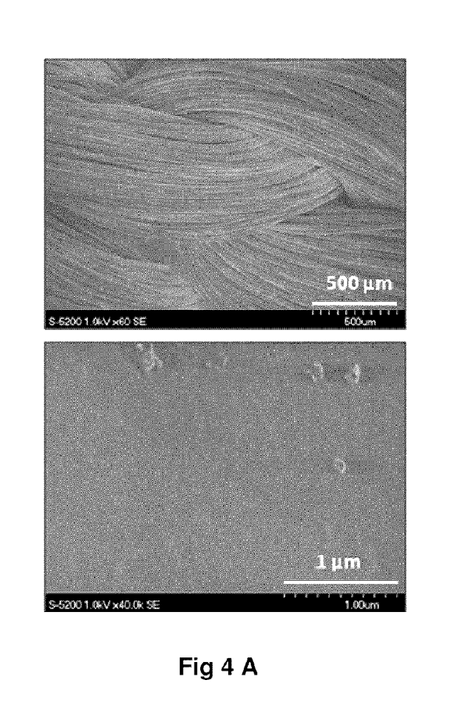
FIG. 4A illustrates a representative SEM image of nylon ropes that are not coated with polymer.
FIG. 4B illustrates a representative SEM image of nylon ropes dip-coated with aqueous triblock copolymer solution.

FIG. 4A shows a SEM image of the texture of the uncoated nylon ropes. As can be seen no nanopatterns are observed. Films made from polystyrene-block-poly(2-vinyl pyridine)-block poly(ethylene oxide) by dip-coating onto nylon ropes and UV treatment showed nanopatterned brush-like morphology on the surface of the nylon rope as can be seen in FIG. 4B.

Conclusion

The fabrication of films using a triblock copolymer by dip-coating onto nylon ropes was successful. The results show that the nanoscale pattern of these films is preserved in water. Thus, this method can be used for a low-volatile organic compound (VOC)-coating process targeted to prevent biofouling.

It will be understood that spray-coating, solvent-casting, brushing or pouring the composition over the desired surface are viable methods. This example is for illustration purposes only.

Example 3

Fabrication of a Coating Based on Polystyrene-Block-Poly(2-Vinyl Pyridine)-Block-Poly(Ethylene Oxide) on Stainless Steel Materials and Methods Polystyrene-block-poly(2-vinyl pyridine)-block-poly(ethylene oxide) triblock copolymer (Polymer Source) was used without further purification. Polystyrene-block-poly(2-vinyl pyridine)-block-poly(ethylene oxide) (polydispersity index 1.09, number average molecular weight for polystyrene 13,000 g/mol, for poly(2-vinyl pyridine) 13,000 g/mol, and for poly(ethylene oxide) 36,000 g/mol) was dissolved in chloroform to give a 5 wt %. Polystyrene-block-poly(ethylene oxide) (polydispersity index 1.05, number average molecular weight for polystyrene 3,600 g/mol and for poly(ethylene oxide) 67,000 g/mol) was dissolved in pH 1 aqueous solution. Polystyrene-block-poly(ethylene oxide) was used as a phase transfer agent. The triblock copolymer solution was introduced into a separatory funnel and the aqueous solution containing the phase transfer agent is added to the funnel. The two solutions were separated after two hours. The aqueous solution is turbid. The triblock copolymer extracted aqueous solution was coated onto a piranha cleaned polished stainless steel mirror by pouring onto the surface. The films were UV irradiated using a Mercury Arc Lamp (Pen-Ray, 90-0012-01) with an intensity of 15 mW/cm² for 5 minutes in air.

Surface Characterization

The surface topography was investigated using Atomic Force Microscopy (AFM). Measurements in air were performed with the AFM (Digital Instruments, Dimension 5000) operated in Tapping Mode and rectangular shaped silicon probes (NanoWorld, NCH) with resonance frequencies in the range 280-320 kHz and a spring constant of 40 N/m.

Results and Discussion

Figure 5:
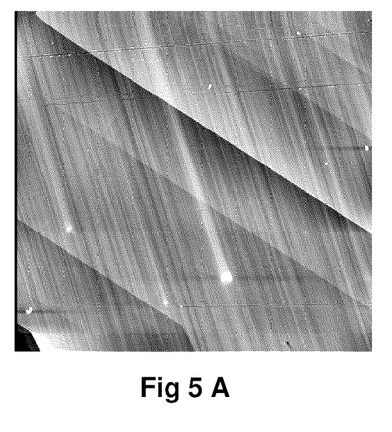
FIG. 5A illustrates a representative AFM height-image of a piranha cleaned stainless steel mirror, the image size is 5 µm×5 µm, and the Z range is 30 nm.
FIG. 5B illustrates a representative AFM height-image of a piranha-cleaned stainless steel coated with triblock copolymer film prepared by pouring method, the image size is 5 µm×5 µm and the Z range is 200 nm.
Figure 6:
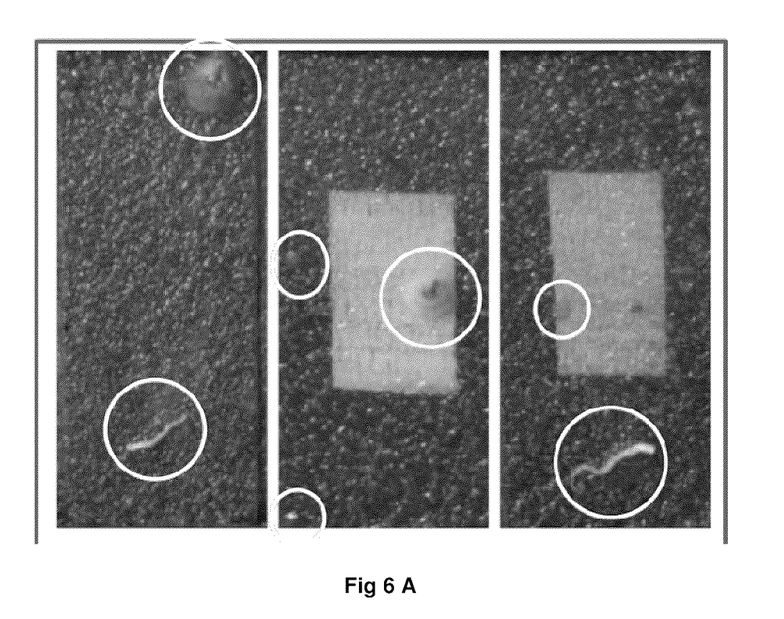
FIG. 6 shows tubeworm and barnacle growth on glass slides coated with (A) PDMS and (B) aqueous triblock copolymer micelles, one-sided slides were placed in slide holders and submerged 0.5 m below water surface.

FIG. 5A shows an AFM image of the texture of the uncoated polished stainless steel mirror. Films made from polystyrene-block-poly(2-vinyl pyridine)-block-poly(ethylene oxide) by dip-coating onto stainless steel displayed a nanostructured brush-like topography as shown in FIG. 5B.

Conclusion

The fabrication of films using a triblock copolymer by pouring onto stainless steel was successful. Thus, this method can be used for a low-volatile organic compound (VOC)-coating process targeted to biofouling.

It will be understood that spray-coating, solvent-casting, brushing, or dip-coating the composition over the desired surface are viable methods. This example is for illustration purposes only.

In summary, the present invention relates to an amphiphilic block copolymer having a general formula ABC wherein A and C have a different hydrophobicity with the hydrophobicity of the blocks A and C tailored to target either features of a specific organism or a group of organisms. B is responsive block, in particular a pH responsive block.

Without limiting the scope of the present invention and without being limited to any theory, one explanation of why the present coatings exhibit such efficacy for prevention of fouling of surfaces by marine organisms contemplated by the inventors is that the blocks A, B and C each have respective molecular weights selected to give a length or size scale of the nanosized patterns selected to correspond to a length or size scale of features of the specific organism or a group of organisms that disrupts or enhances the ability of the specific organism or a group of organisms from adhering to the coated surface. The responsive B block can also be used to tailor the length or size scale of the features.

Thus the block copolymer referred to in the previous paragraph covers any number of blocks, diblock, triblock and multiblock, and is not restricted to triblock copolymers.

In a preferred embodiment of the present invention, ABC triblock copolymer mixed/not mixed with a photo-initiator and cross-linked is used to make coatings that inhibit attachment of marine biofouling organisms and/or affect (enhance or inhibit) the settlement and growth of other organisms or cells.

The triblock copolymer can have a molecular weight from about 1,000 g/mol to about 1,000,000 g/mol. In a specific embodiment, the triblock copolymer molecular weight can be from 10,000 g/mol to 40,000 g/mol.

In a preferred embodiment of the present invention, an A'B' diblock copolymer dissolved in aqueous is used as a phase transfer agent.

The phase transfer agent A'B' diblock copolymer can have a molecular weight from about 1,000 g/mol to about 1,000,000 g/mol. In a specific embodiment, the A'B' diblock copolymer molecular weight can be from 3,000 g/mol to 70,000 g/mol.

Thus the phase transfer agent A'B' block copolymer referred to in the previous paragraph covers any number of blocks, diblock, triblock and multiblock, and is not restricted to diblock copolymers.

In a specific embodiment of the present invention, polystyrene-block-poly(2-vinyl pyridine)-block-poly(ethylene oxide)dissolved in chloroform and transferred to aqueous solution comprising a phase transfer agent in particular polystyrene-block-poly(ethylene oxide) to obtain a micellar solution aqueous solution. The solution is transferred to a substrate and the resulting film is UV cross-linked. The films have been found to retain their nanoscale pattern under water.

The present invention is useful in fabricating low-VOC antifouling coatings because the method involves coating of triblock copolymer films from aqueous solution to any material and topography with minimal surface reconstruction in aqueous environment. These films can be used as a substitute for metal biocide paints in the surface protection of structures such as aquaculture cages and ship hulls.

The invention also provides a method for coating a surface by contacting the surface with the block copolymer mixture. The coating method can be performed by dip-coating, brushing, spray-coating, spin-coating, solvent-casting, brushing or pouring over the desired surface. Thus, the invention provides a method of coating and protecting a surface from biofouling and/or affecting (enhancing or inhibiting) the settlement and growth of other organisms or cells The block copolymer coating can be used independently as an antifouling coating or in conjunction with a base layer of another polymer such as a random copolymer made of the same monomers as the block copolymer used in the coating.

The coating can result in a top layer of 20 nm to 300 nm in thickness.

In an embodiment of the present invention there is provided a method of applying an antifouling coating to a surface for preventing marine biofouling in marine environments and/or affecting (enhancing or inhibiting) the settlement and growth of other organisms or cells, comprising:

dissolving the ABC triblock, diblock or multiblock copolymer in a water immiscible organic solvent to produce a solution, transferring the block copolymer to an aqueous solution comprising a A'B' diblock copolymer as the phase transfer agent to obtain a micellar solution, coating surfaces with the block copolymer micellar solution to produce thin films, UV treating the films gives a cross-linked coating.

The ABC copolymer, where A and C each have a different hydrophobicity and B is a pH responsive block with the hydrophobicity and responsive block tailored to target either a specific organism or a group of organisms and where A B and C each have respective molecular weights and B being a responsive block, selected to give a length or size scale of the nanosized patterns selected to correspond to a length or size scale of the features of a specific organism or a group of organisms. Without limiting the scope of the present invention and without being limited to any theory, it is believed that this selected length scale of the nanosized patterns disrupts or enhances the ability of the specific organism or a group of organisms from adhering to the coated surface.

Example 4

Synthesis of Encapsulated Aggregates of Nanoparticles in Aqueous Media for Biodiagnostic Applications Materials and Methods Polystyrene-block-poly(2-vinyl pyridine)-block-poly(ethylene oxide) triblock copolymer (Polymer Source) was used without further purification. Polystyrene-block-poly(2-vinyl pyridine)-block-poly(ethylene oxide) (polydispersity index 1.09, number average molecular weight of polystyrene 13,000 g/mol, of poly(2-vinyl pyridine) 13,000 g/mol, and of poly(ethylene oxide) 36,000 g/mol) was dissolved in chloroform to give a 5 wt % solution. Polystyrene-block-poly(ethylene oxide) (polydispersity index 1.05, number average molecular weight of polystyrene 3,600 g/mol, and of poly (ethylene oxide) 67,000 g/mol) was dissolved in pH 1 aqueous solution. Polystyrene-block-poly(ethylene oxide) was used as a phase transfer agent. The triblock copolymer solution was introduced into a separatory funnel and the aqueous solution containing the phase transfer agent is added to the funnel. The two solutions were separated after two hours. The aqueous solution was turbid. The block copolymer aqueous micelles were then loaded with excess 1 mM Auric chloride. The solution was allowed to stir in the dark for 24 hours. The metal salt loaded micelles were then dialyzed against pH 1 aqueous solution for 48 hours to remove excess metal salt. The salt was then reduced using cold (4 deg) aqueous sodium borohydride solution within the micelles to obtain controlled aggregates of nanoparticles. It will be understood that other metal salts may be used, and is not restricted to Au, and that the metal salt within the micelles may be reduced by chemical reduction using inorganic or organic reductants or ultraviolet light.

Characterization

The encapsulated aggregated gold nanoparticles were imaged using a Hitachi H-7000 transmission electron microscope. Samples for transmission electron microscopy were prepared by placing a drop of nanoparticle encapsulated block copolymer solution on a carbon-coated copper grid and wicking away excess liquid. Grids were then air-dried. TEM instrument operated at 50 kV.

Result and Discussion

Figure 7:
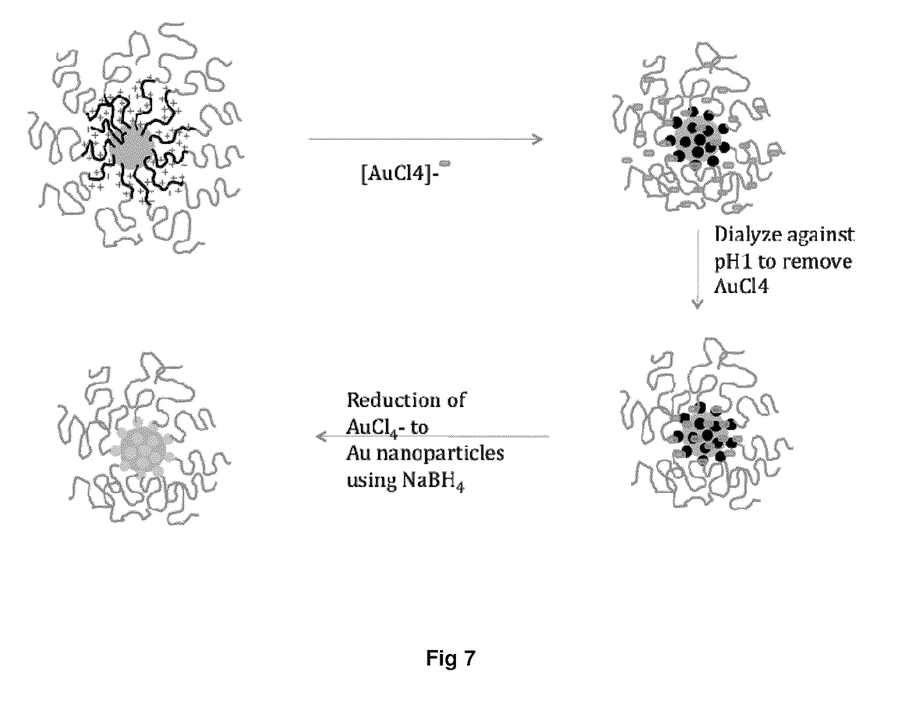
FIG. 7 illustrates the reaction steps in the synthesis of controlled aggregates of encapsulated gold nanoparticles.
Figure 8:
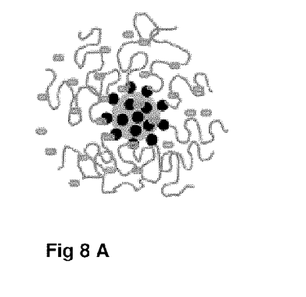
FIG. 8 is a series of schematics (A-C) and corresponding photograph (D) of the metal salt-loaded aqueous micellar solution before dialysis (left), after dialysis (middle), and after reduction (right), the metal salt-loaded micellar solution is yellow in color before dialysis, colorless after dialysis, and pink after reduction with sodium borohydride.
Figure 9:
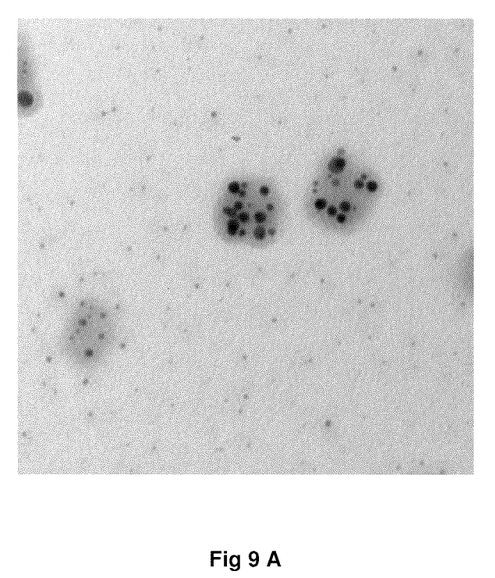

FIG. 7 shows a schematic of the synthesis of encapsulated nanoparticles in the aqueous triblock copolymer micelles described above. FIG. 8 shows the schematics and corresponding photograph of the metal salt loaded aqueous micellar solution before dialysis (left), after dialysis (middle), and after reduction (right). The metal salt loaded micellar solution is yellow in color before dialysis, colorless after dialysis and pink after reduction with sodium borohydride. FIG. 9 shows the transmission electron microscope images of encapsulated aggregates of gold nanoparticles in a triblock copolymer micelle. It is observed that the size of the nanoparticles varies from 3-6 nm. 10-25 nanoparticles can be synthesized in one 40-50 nm block copolymer micelle.

Conclusion

Controlled aggregation of metal nanoparticles was obtained within individual block copolymer micelles. The method of encapsulating nanoparticles has potential application in biodiagnostic imaging. The close proximity of the nanoparticles with or without direct contact between them leads to enhanced signal for bio-imaging including Raman scattering and magnetic resonance imaging. Also, due to the small particle diameter, in vivo applications are possible as the kidney can excrete the particles easily.

Example 5

Active Compound Nano-Encapsulation in Biodegradable Polymeric Micelles for Controlled Release Applications Materials and Methods Polycaprolactone-block-poly(ethylene oxide)-block polycaprolactone triblock copolymer (Polymer Source) was used without further purification. Polycaprolactone-block-poly (ethylene oxide)-block polycaprolactone (polydispersity index 1.25, with average number molecular weight polycaprolactone-block-poly(ethylene oxide)-block polycaprolactone triblock copolymer of 4,000-:10,000-:4,000 g/mol was dissolved in chloroform to give a 2 wt %. Polystyrene-block-poly(ethylene oxide) (polydispersity index 1.05, number average number molecular weight of polystyrene 3,600 g/mol and of poly(ethylene oxide) 67,000 g/mol) was dissolved in Milli Q water. Polystyrene-block-poly(ethylene oxide) was used as a phase transfer agent. The triblock copolymer solution was introduced into a separatory funnel and the aqueous solution containing the phase transfer agent is added to the funnel. The two solutions were separated after two hours. The aqueous solution was turbid.

The aqueous triblock copolymer micellar solution was then loaded with 7 g/l trifluralin (herbicide). The composition was sonicated for 5 minutes and then allowed to stand in the dark for 7 days. Seventy mg of trifluralin was added to 10 mL of Milli Q water and sonicated for 5 min and then allowed to stand in the dark for 7 days.

Result and discussion

Figure 10:
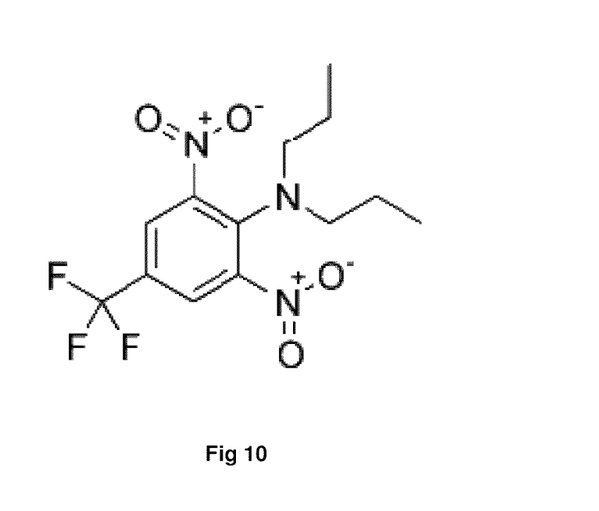
FIG. 10 illustrates the molecular structure of trifluralin, a commonly used pre-emergence herbicide.
Figure 11:
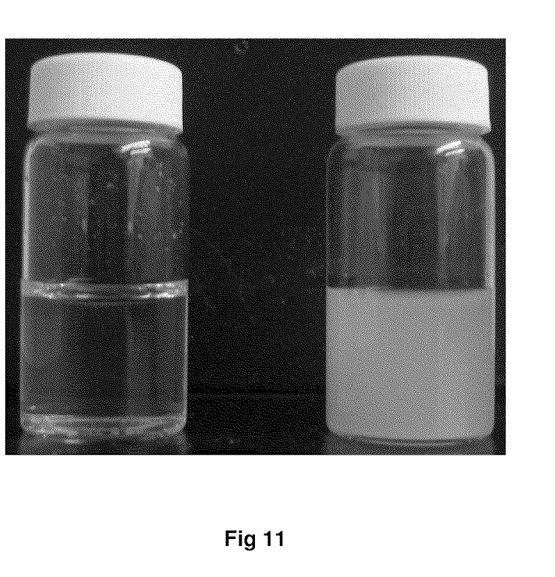
FIG. 11 shows a digital photograph of: (left) trifuralin sonicated in Milli-Q water alone, where hydrophobic trifluralin is not solubilized in water; and (right) trifuralin sonicated in a biocompatible aqueous polycaprolactone-block-polyethene oxide-block-polycaprolactone triblock copolymer micellar solution, showing solubilization of trifuralin. Images were obtained 1 week after standing.

FIG. 10 shows the molecular structure of trifluralin. The molecule is highly hydrophobic. FIG. 11 shows digital photographs of trifuralin sonicated in Milli-Q water (left) and trifuralin sonicated in biocompatible aqueous polycaprolactone-block-polyethene oxide-block-polycaprolactone triblock copolymer micellar solution (right) obtained after 1 week of standing.

Trifluralin did not dissolve in Milli Q water alone even after up to 7 days, however, it was observed that trifluralin dissolved using mild sonication for a short period of time (e.g. a few minutes) resulted in the milky micellar solution turning yellow. The solution retained the yellow colour after up to 7 days and demonstrated no sedimentation of trifluralin.

Conclusion

Trifluralin, a highly hydrophobic active compound, was encapsulated into a biocompatible and biodegradable triblock copolymer aqueous micellar solution. Aqueous micellar solutions as described above can be used for encapsulation of a number of different active agents including insecticides, herbicides, pharmaceuticals and flavouring materials. The solutions provide encapsulated active compounds that can be used in controlled/slow release of active molecules in crop protection, drug delivery and flavouring compounds in the food and beverage industry.

Example 6

Fabrication of a Coating Based on Polycaprolactone-Block-Poly(Ethylene Oxide)-Block Polycaprolactone Block Copolymer on Stainless Steel Materials and Methods Polycaprolactone-block-poly(ethylene oxide)-block polycaprolactone triblock copolymer (Polymer Source) was used without further purification. Polycaprolactone-block-poly (ethylene oxide)-block polycaprolactone (polydispersity index 1.25, with number average molecular weight polycaprolactone-block-poly(ethylene oxide)-block polycaprolactone triblock copolymer of 4,000-10,000-4,000 g/mol) was dissolved in chloroform to give a 2 wt % solution. Polystyrene-block-poly(ethylene oxide) (polydispersity index 1.05, number average molecular weight of polystyrene 3,600 g/mol, and of poly(ethylene oxide) 67,000 g/mol) was dissolved in Milli Q water. Polystyrene-block-poly(ethylene oxide) was used as a phase transfer agent. The triblock copolymer solution was introduced into a separatory funnel and the aqueous solution containing the phase transfer agent was added to the funnel. The two solutions were separated after two hours. The aqueous solution was observed to be turbid. The triblock copolymer-extracted aqueous solution was coated onto a piranha cleaned polished stainless steel mirror by dip-coating method.

Surface Characterization

The surface topography was investigated using Atomic Force Microscopy (AFM). Measurements in air were performed with the AFM (Digital Instruments, Dimension 5000) operated in Tapping Mode and rectangular shaped silicon probes (NanoWorld, NCH), with resonance frequencies in the range of 280-320 kHz and a spring constant of 40 N/m.

Results and Discussion

Figure 12:
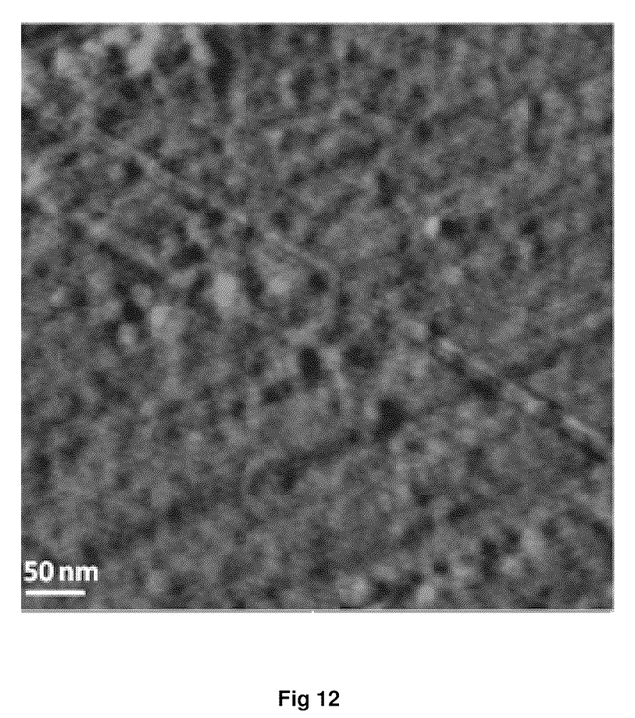
FIG. 12 shows an AFM image of the nano-texture of the polycaprolactone-block-poly(ethylene oxide)-block polycaprolactone triblock copolymer film obtained by dip-coating onto stainless steel.

FIG. 12 shows an AFM image of the nano-texture of the polycaprolactone-block-poly(ethylene oxide)-block polycaprolactone triblock copolymer film obtained by dip-coating onto stainless steel.

Conclusion

The fabrication of films using a triblock copolymer onto stainless steel using the dip-coating method was successful. The block copolymer, being biocompatible and biodegradable, can be used for drug-encapsulated medical device coating applications.

As used herein, the terms "comprises", "comprising", "includes" and "including" are to be construed as being inclusive and open ended, and not exclusive. Specifically, when used in this specification including claims, the terms "comprises", "comprising", "includes" and "including" and variations thereof mean the specified features, steps or components Therefore what is claimed is:

1. A method of transferring a block copolymer from an organic phase to an aqueous phase comprising:
   a) dissolving an amphiphilic block copolymer in a water-immiscible organic solvent, or a mixture of water-immiscible organic solvents; and
   b) transferring the amphiphilic block copolymer to an aqueous solution in the presence of a phase transfer agent to obtain a micellar solution,
   wherein said amphiphilic block copolymer is a triblock copolymer or a multiblock copolymer having four or more blocks and the phase transfer agent is a diblock copolymer having the formula A'B'.

2. The method of claim 1 wherein said multiblock copolymer includes tetrablock copolymers to heptablock copolymers.

3. The method of claim 1, wherein the amphiphilic block copolymer is selected from the group consisting of polystyrene-block-poly(2-vinyl pyridine)-block-poly(ethylene oxide), polystyrene-block-poly(4-vinyl pyridine)-block-poly(ethylene oxide), polystyrene-block-poly(2- vinyl pyridine)-block-poly(N-isopropyl acrylamide), and poly(t-butyl styrene-b-hydrogenated isoprene-b-sulfonated styrene-b-hydrogenated isoprene-b-t-butyl styrene).

4. The method of claim 1, wherein the molecular weight of the block copolymer is from about 1,000 g/mol to about 1,000,000 g/mol.

5. The method of claim 1 wherein the amphiphilic block copolymer is one of neutral or charged.

6. The method of claim 1, wherein A' and B' have significantly different hydrophobicity from each other.

7. The method of claim 1, where a molecular weight of A' and B' is in a range from about 1,000 g/mol to about 1,000,000 g/mol.

8. The method of claim 1, wherein the organic solvent is selected from the group consisting of chloroform, toluene, pentane, hexane, heptane, decane, cyclohexane, and benzene.

9. The method of claim 1 including a step of applying the micellar solution to a surface of a substrate to produce nanosized patterns on the surface and cross-linking the block copolymer nanosized pattern to form a coating.

10. The method according to claim 9 wherein said block copolymer nanosized pattern is cross-linked using ultraviolet light or heat.

11. The method of claim 10 wherein an initiator agent is used for cross-linking.

12. The method of claim 11 wherein the initiator agent is any one or combination of a radical initiator, a cationic initiator, and an anionic initiator.

13. The method according to claim 11 wherein the initiator agent is a photo-initiator selected from the group consisting of benzophenone, benzoin ethyl ether, and [1,12-dodecanediylbis(oxy-4,1-phenylene)][bis[phenylmethanone].

14. The method of claim 9 wherein the micellar solution is applied to the surface by spin-coating, solvent-casting, brushing, immersing, spraying or pouring the solution over the surface.

15. The method according to claim 14 including a step of applying the solution to the surface in sufficient quantity to give a coating thickness in a range from about 20 nm to about 300 nm.

16. The method of claim 9 including a step of irradiating the coating with ultraviolet light in order to improve stability and mechanical properties of the coating.

17. The method of claim 1 including the steps of forming a mixture of the micellar solution with a solution of a metal salt and agitating the mixture to produce metal salt-loaded micelles, dialyzing the metal salt loaded micelles against an aqueous solution of selected pH to remove excess metal salt, and reducing the metal salt within the micelles to obtain controlled aggregates of nanoparticles.

18. The method according to claim 17 wherein said metal salt within the micelles is reduced by chemical reduction using organic reductants or ultraviolet light.

19. The method of claim 1 including a step of forming a mixture of the micellar solution with a solution of an active compound followed by mixing and allowing the mixture to stand for a selected period of time to encapsulate the active compound within the micelles.

20. The method according to claim 19 wherein said active compound is selected from the group consisting of insecticides, herbicides, pharmaceuticals and flavouring materials.

* * * * *